Patented Nov. 1, 1938

2,134,947

UNITED STATES PATENT OFFICE 2,134,947

PROTECTIVE COSMETIC

Samuel Isermann, Summit, Ernst Ohlsson, Jersey City, and John W. Orelup, Summit, N. J.

No Drawing. Application September 13, 1935, Serial No. 40,434

3 Claims. (Cl. 167—90)

Our present invention relates to improvements in protective cosmetics. In our co-pending application Serial No. 22,780 we have set forth the problem involved which is to devise a protective cosmetic which will be effective in small concentrations to filter out the ultra-violet radiation or sun radiation especially between 2900 and 4500 Angstron units and which shall be without toxic or irritating effect on the skin. It is also desirable that the compound be oil soluble and preferably without appreciable staining or tinctorial power.

In our previous application we have mentioned the use of a filter of fused calcium phosphate colored with oxides of nickel and cobalt through which only physiologically active rays can pass and by means of which the testing of various materials for the purpose is facilitated.

We have now discovered that the class of organic compounds consisting of two benzene rings connected by chains containing one or more unsaturated bonds with oxy or oxo groups are of great efficacy as filters for ultra-violet light in the region from 3000 to 4000 Angstrom units. In general, these compounds are obtained by condensing an aromatic aldehyde with an aromatic ketone or by condensing two moles of an aromatic aldehyde with one mole of an aliphatic ketone. In addition we have discovered that the class of organic compounds consisting of two benzene rings connected by chains of at least three carbon atoms having one or more unsaturated bonds therein, but without oxy or oxo groups are also of high efficacy as filters of ultra violet light in the same region. As examples of such compounds may be mentioned:

I

Cinnamal acetophenon $C_6H_5 \cdot CH=CH \cdot CH=CH \cdot OC \cdot C_6H_5$ which may be obtained by condensing cinnamic aldehyde and phenyl methyl ketone i. e.

$C_6H_5 \cdot CH=CH \cdot CHO + CH_3 \cdot OC \cdot C_6H_5 \rightarrow$
$H_2O + C_6H_5 \cdot CH=CH \cdot CH=CHOC \cdot C_6H_5$

II

Dibenzal acetone $C_6H_5 \cdot CH=CHCO \cdot CH=CH \cdot C_6H_5$ which may be obtained by condensing two moles of benzaldehyde with one mole of acetone i. e.

$C_6H_5 \cdot CHO + CH_3 \cdot CO \cdot CH_3 + OHC \cdot C_6H_5 \rightarrow$
$2H_2O + C_6H_5 \cdot CH=CH \cdot COCH=CH \cdot C_6H_5$ Various useful compounds may be obtained by condensing an aromatic aldehyde with a dibasic acid, as for example phenylacetaldehyde and succinic acid to produce dibenzyl butadiene $C_6H_5 \cdot CH_2CHO + HOOC \cdot CH_2 \cdot CH_2 \cdot COOH +$
$OHC \cdot H_2C \cdot C_6H_5 \rightarrow$
$2CO_2 + 2H_2O + C_6H_5 \cdot CH_2 \cdot CH=CH \cdot CH=$
$CH \cdot CH_2 \cdot C_6H_5$ (dibenzyl butadiene).

The above compounds are practically odorless, are not irritating to the skin and are effective in concentrations of 1% or less.

The preparation used may be mixed with various other ingredients for producing a cosmetic as illustrated by the following examples.

1. A preparation of the consistency of cream may be compounded as follows:

| | Parts |
|---|---|
| Di ethylene glycol mono stearate | 48 |
| Cetyl alcohol | 20 |
| White wax | 4 |
| Mineral oil | 8 |
| Lanolin | 6 |
| White vaseline | 3 |
| Lanolin alcohols | 3 |
| Phenyl benzoyl butadiene (cinnamaliden acetophenon) or other active ingredient as above set forth | 1 |
| Intramine (sodium salt of sulphated collamine of fatty acid) | 4 |
| Water | 300 |

The above quantities may be varied more or less. Certain of the various ingredients serve as an emollient for the skin while ingredients such as the intramine, the diethylene glycol monostearate and others serve as emulsifiers whereby the preparation may be removed from the skin by application of water.

Furthermore, the above composition, especially because of its content in cetyl alcohol and lanolin alcohols (the latter being a natural secretion of the skin) has restorative properties whereby use of the preparation not merely protects against ultra-violet light but is in addition a valuable cleansing and emollient preparation.

2. Any of the active ingredients above set forth may be incorporated in an oil as by compounding 1% of the active substance with say 19% of a vegetable oil such as peanut oil and 80% of mineral oil.

We claim:

1. A cosmetic effective in thin films to retard ultra violet light absorption containing as an active ingredient cinnamal acetophenon in a vehicle capable of application to the skin, said active ingredient being present in an amount not substantially greater than 1%.

2. A cosmetic effective in thin films for protecting against light of short wave length containing as an active ingredient dibenzal acetone in a vehicle capable of application to the skin, said active ingredient being present in an amount not substantially greater than 1%.

3. A cosmetic effective in thin films to retard absorption of light of short wave length containing as an active ingredient a compound selected from the following group: cinnamal acetophenon and dibenzal acetone, in a vehicle capable of application to the skin, said active ingredient being present in an amount not substantially greater than 1% and being characterized by relative permanency, non-irritation and substantial lack of color and odor.

SAMUEL ISERMANN.
J. W. ORELUP.
ERNST OHLSSON.